US006696673B2

(12) United States Patent
Okamoto

(10) Patent No.: US 6,696,673 B2
(45) Date of Patent: Feb. 24, 2004

(54) GAS CONCENTRATION DETECTOR HAVING HEATER FOR USE IN INTERNAL COMBUSTION ENGINE

(75) Inventor: Yoshiyuki Okamoto, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 232 days.

(21) Appl. No.: 09/904,866

(22) Filed: Jul. 16, 2001

(65) Prior Publication Data

US 2002/0017285 A1 Feb. 14, 2002

(30) Foreign Application Priority Data

Aug. 7, 2000 (JP) ....................................... 2000-238833

(51) Int. Cl.[7] .......................... G06F 19/00; F02D 45/00
(52) U.S. Cl. ....................................... 219/494; 123/697
(58) Field of Search .......................... 219/494; 123/685, 123/697, 687; 701/102; 204/424–426, 406

(56) References Cited

U.S. PATENT DOCUMENTS 4,332,225 A * 6/1982 Cox et al. ................... 123/697
4,538,575 A * 9/1985 Chujo et al. ................ 204/431
4,561,402 A * 12/1985 Nakano et al. ............ 73/23.32
4,655,182 A * 4/1987 Nakano et al. .......... 123/179.1
4,873,642 A * 10/1989 Mieno et al. ............... 123/697
4,911,130 A * 3/1990 Takahashi et al. .......... 123/683
5,148,795 A * 9/1992 Nagai et al. ................ 123/697
5,596,975 A * 1/1997 Thomas et al. ............. 123/686
5,719,778 A 2/1998 Suzumura et al.
5,752,493 A * 5/1998 Abe et al. ................... 123/686
5,852,228 A 12/1998 Yamashita et al.
5,919,346 A * 7/1999 Suzuki et al. ............... 204/424
5,922,226 A * 7/1999 Mizusawa ................... 219/486
5,928,303 A * 7/1999 Sakai ......................... 701/109
6,304,813 B1 * 10/2001 Ikeda et al. ................. 701/109
6,409,969 B1 * 6/2002 Streicher et al. .............. 422/94

FOREIGN PATENT DOCUMENTS

JP 58-82149 * 5/1983
JP 58-105056 * 6/1983
JP 62-129754 * 6/1987
JP 1-155260 * 6/1989
JP 4-183920 * 6/1992
JP 11-344466 12/1999

* cited by examiner

*Primary Examiner*—John A. Jeffery
(74) *Attorney, Agent, or Firm*—Nixon & Vanderhye PC

(57) ABSTRACT

A gas concentration detector includes a detector element measuring a constituent gas concentration in exhaust gas emitted from an internal combustion engine and a heater for activating the detector element. During a cranking period of the engine, the heater is pre-heated by electric current supplied thereto in a controlled manner to increase a heater resistance to a certain level. After the engine cranking is completed, a full voltage is supplied to the heater, and thereafter the heater current is supplied in a controlled manner to keep the detector element activated. Since the heater resistance is increased to a certain level by pre-heating, an amount of heater current is limited to a certain level when the full voltage is supplied, and thereby the detector element is prevented from being damaged by an excessive heat stress.

14 Claims, 10 Drawing Sheets

GAS CONCENTRATION DETECTOR HAVING HEATER FOR USE IN INTERNAL COMBUSTION ENGINE

CROSS-REFERENCE TO RELATED APPLICATION

This application is based upon and claims benefit of priority of Japanese Patent Application No. 2000-238833 filed on Aug. 7, 2000, the content of which is incorporated herein by reference.

BACKGROUND OF THE INVENTION

1. Field of the Invention

The present invention relates to a gas concentration detector that detects constituent gas concentration in exhaust gas from an internal combustion engine. The gas concentration detector detects, for example, oxygen concentration in the exhaust gas to control an air-fuel ratio in an intake system of the internal combustion engine. More particularly, the present invention relates to a controller that controls temperature of a detector element of the gas concentration detector.

2. Description of Related Art

A gas concentration detector of this kind is the known marginal-current-type oxygen sensor. A device for controlling a heater of such a sensor is disclosed in, for example, JP-A-278279 and JP-A-300716. Two types of such sensors have been known, one is a cup-type and the other is a lamination-type having laminated heater and sensor elements. Recently, the lamination-type oxygen sensors are becoming more popular in the market, because they can be made compact at low cost and have better temperature characteristics.

An example of the lamination-type oxygen sensor is disclosed in JP-A-11-344466. A sensor element and a heater for heating the sensor element to activate the sensor element are positioned closely to each other, and therefore a temperature difference between the sensor element and the heater is relatively small. Therefore, a current supplied to the heater is controlled based on an internal impedance of the sensor element, not based on a detected heater resistance. That is, the heater current is controlled by feeding-back the sensor element impedance so that the sensor element impedance is maintained at a target value. In the lamination-type oxygen sensor, an amount of heat generated in the heater, i.e., an amount of heater current, can be kept low, because the heat is effectively transferred from the heater to the sensor element.

In the conventional oxygen sensor, however, it is highly possible that excessive heater current is supplied to the heater when the heater resistance is low at a low temperature. As shown in FIG. 15A, the heater resistance increases in proportion to the heater temperature, and therefore the lower the heater temperature, the lower the heater resistance. Accordingly, as shown in FIG. 15B, the power supplied to the heater exceeds a permissible level at a low heater temperature. Since the power supply to the heater commences, in the conventional sensor, after the internal combustion engine is cranked and brought into operation, an excessive current is supplied to the heater if the heater temperature is low. Moreover, a high current is supplied to the heater at the beginning of the engine operation to quickly activate the sensor element. If the power exceeding the permissible level is supplied to the heater, the heater may be broken by an excessive heat stress and also the sensor element may be broken thereby. This problem is serious especially in the lamination-type oxygen sensor.

Further, the heater resistance is not detected in the lamination-type sensor because the temperature difference between the heater and the sensor element is not large. Therefore, the heater current cannot be controlled according to the heater resistance, and it is highly possible that the heater power exceeding the permissible level is supplied to the heater at a low temperature. It is conceivable to estimate the heater temperature based on an engine coolant temperature, an intake air temperature or the like and to prohibit the power supply to the heater at a very low temperature. However, there is a possibility that the heater temperature is low even if the coolant or the intake air temperature is relatively high. Such a situation occurs, for example, when the engine is re-started after a dead soak. Accordingly, it is difficult to solve the excessive power supply problem only by measuring the coolant or the intake air temperature.

SUMMARY OF THE INVENTION

The present invention has been made in view of the above-mentioned problem, and an object of the present invention is to provide an improved gas concentration detector in which a detector element is properly activated by a heater while avoiding an excessive heating power supply to the heater.

The gas concentration detector detects concentration of a constituent gas such as oxygen in exhaust gas emitted from an internal combustion engine. An air-fuel ratio in an intake system is controlled based on the detected gas concentration. The gas concentration detector includes a detector element made of a material such as solid electrolyte and a heater to activate the detector element.

During a cranking period of the engine, the heater is pre-heated under a pre-heating control, and after the engine cranking is completed, the heater is controlled under an in-operation control. At the beginning of the in-operation control, heating current is supplied to the heater with a full duty ratio. Thereafter, the current is supplied with a controlled duty ratio to keep the detector element activated. Since a heater resistance is increased to a certain level by the pre-heating, the heater current is limited to a certain level when the heater current is supplied with the full duty ratio at the beginning of the in-operation control.

In the pre-heating control, the duty ratio of the heater current supply is controlled according to engine starting conditions such as an engine coolant temperature or an intake air temperature. The duty ratio is controlled to supply a higher amount of current as the coolant temperature becomes lower. Further, the duty ratio is adjusted according to a battery voltage to supply a substantially constant power to the heater. Alternatively, an impedance of the detector element is detected, and the duty ratio is controlled to bring the impedance to a target level. The detector element is pre-heated to a temperature (e.g., 500° C.) which is lower than a temperature at which the detector element is activated (e.g. 750° C.) Preferably, the duty ratio in the pre-heating control is gradually increased to the full duty ratio at the beginning of the in-operation control. The pre-heating may be performed only when the engine is started at a low temperature.

According to the present invention, an excessive current supply to the heater, which otherwise occurs at the beginning of the in-operation control, is surely avoided even when the engine is started at a very low temperature because the heater resistance is increased to a certain level by preheating in the cranking period.

Other objects and features of the present invention will become more readily apparent from a better understanding of the preferred embodiments described below with reference to the following drawings.

DETAILED DESCRIPTION OF THE PREFERRED EMBODIMENTS

A first embodiment of the present invention will be described with reference to FIGS. 1–11. In a control system according to the present invention, a constituent gas concentration such as oxygen concentration in exhaust gas exhausted from an internal combustion engine is detected by an oxygen sensor. An air-fuel ratio in an intake system of the engine is controlled to a desired level according to the detected oxygen concentration. A detector element of the oxygen sensor is heated by a heater to activate the sensor element in a controlled manner.

Figure 1:
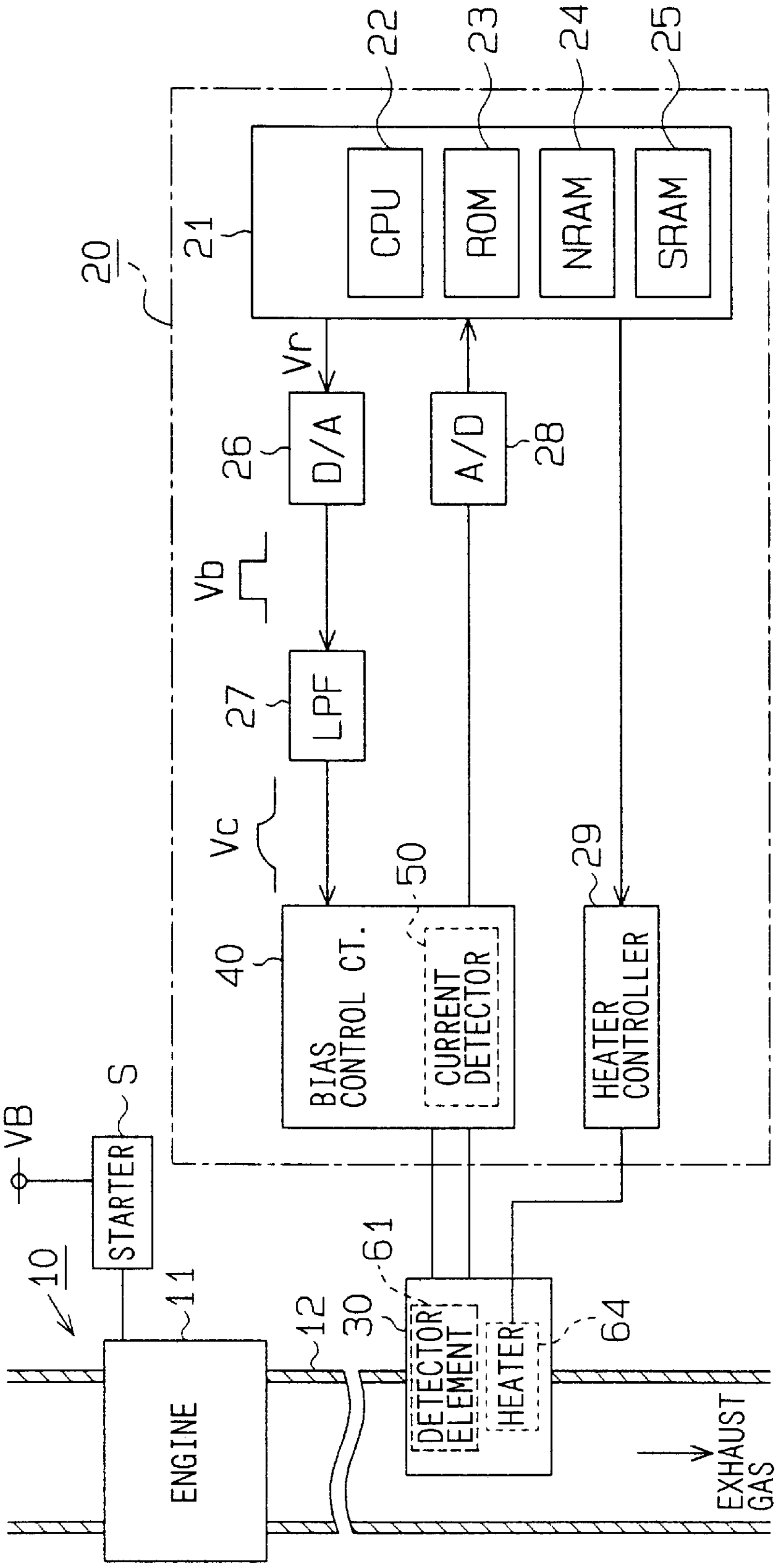
FIG. 1 is a block diagram showing an air-fuel ratio control system for an internal combustion engine.

FIG. 1 shows an air-fuel control system for an internal combustion engine. A marginal-current-type oxygen sensor 30 is installed in an exhaust pipe 12 of the internal combustion engine 11 constituting an engine system 10. The oxygen sensor 30 outputs air-fuel ratio signals proportional to the oxygen concentration in the exhaust gas under control of the ECU 20. The engine 11 is cranked by a starter S to which a battery voltage VB is supplied through a starter switch (not shown).

The ECU 20 includes a microcomputer 21. The microcomputer 21 is composed of a CPU 22 for performing various calculation programs, a ROM 23 for pre-storing control data and programs, an NRAM (normal RAM) 24 for temporarily memorizing calculation data, an SRAM (standby RAM) 25 for maintaining data during power shutoff, and other components. The microcomputer 21 controls fuel injection and ignition of the engine 11, and controls the heater in the oxygen sensor 30, as well. A signal indicating ON or OFF of the starter switch is fed to the microcomputer 21.

Figure 5:
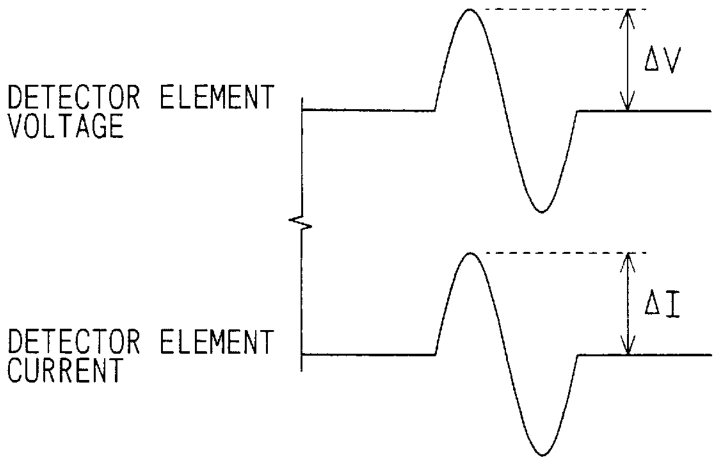
FIG. 5 is a drawing showing waveforms of a voltage and current supplied to a detector element for detecting an impedance of the detector element.

The oxygen sensor 30 is controlled in the following manner. The microcomputer 21 feeds a bias signal Vr for supplying a voltage to the oxygen sensor 30 to a control circuit 40 through a digital-analog converter 26 and a low-pass filter 27. The digital-analog converter 26 converts the bias signal Vr into an analog signal Vb, and the low-pass filter 27 removes high frequency components contained in the analog signal Vb. An output voltage Vc of the low-pass filter 27 is fed to the bias-control circuit 40. A current detector 50 in the bias-control circuit 40 detects a current supplied to the oxygen sensor 30. An analog signal representing the current detected by the current detector 50 is fed to an analog-digital converter 28 which in turn feeds a converted digital signal to the microcomputer 21. The microcomputer 21 reads the sensor current with predetermined intervals (e.g., every several-milliseconds) and converts it into the air-fuel ratio. In detecting an impedance of a sensor element 61 in the oxygen sensor 30, a single voltage having a predetermined time constant is supplied to the detector element 61 based on the rectangular bias signal Vr, as shown in FIG. 5. The microcomputer 21 feeds a heater control signal to a heater controller 29 which in turn controls current supplied to a heater 64 in an on-and-off fashion.

Figure 2:
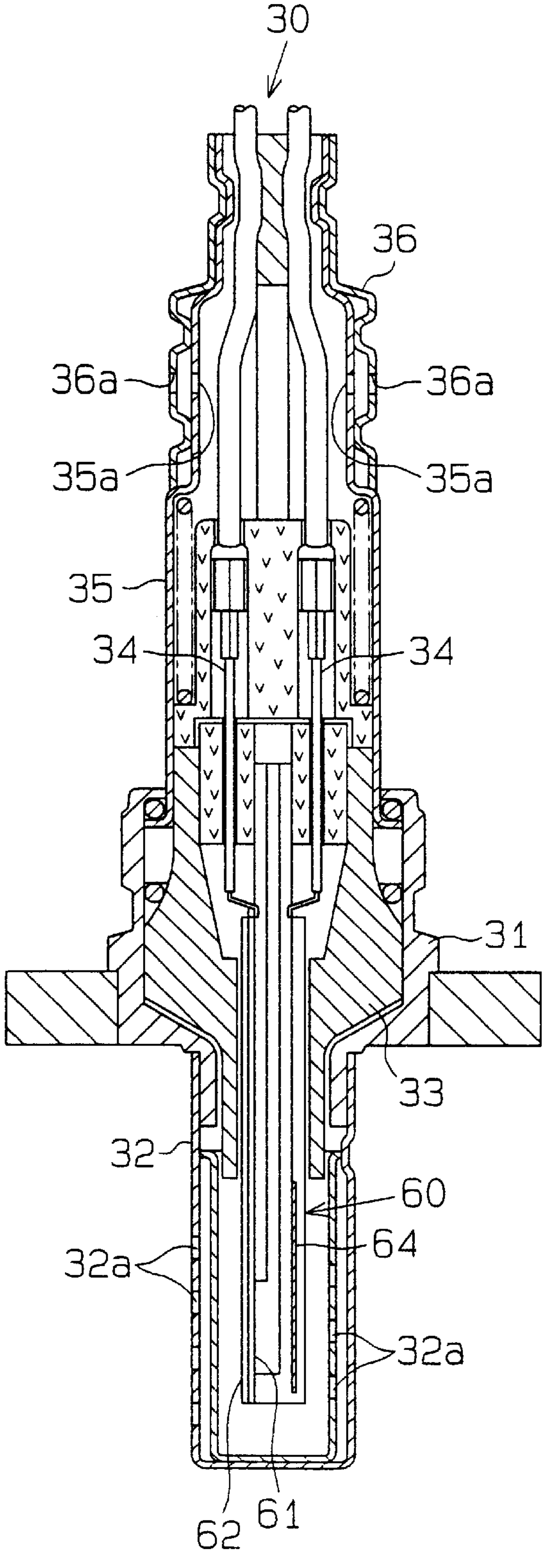
FIG. 2 is a cross-sectional view showing an oxygen sensor used in a gas concentration detector according to the present invention.
Figure 3:
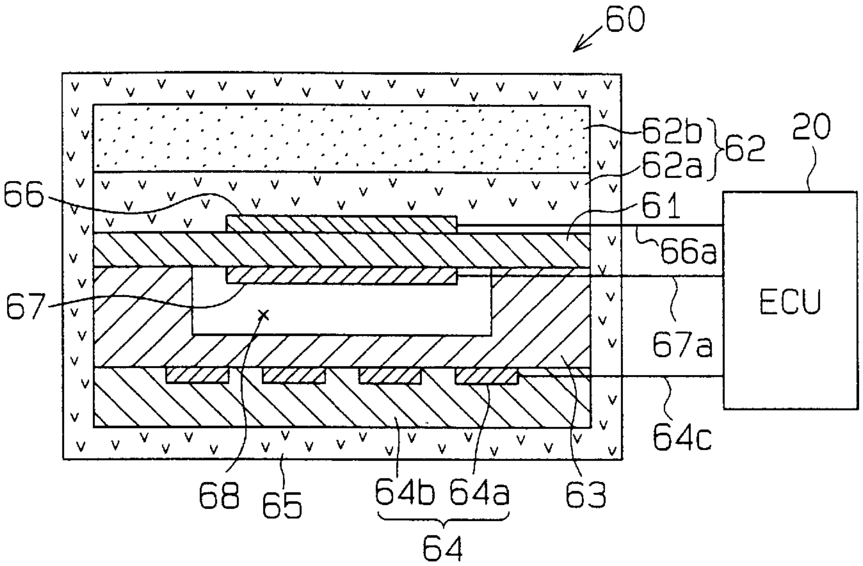
FIG. 3 is a cross-sectional view showing a sensor element used in the oxygen sensor shown in FIG. 2.

Referring to FIGS. 2 and 3, a structure of the lamination-type oxygen sensor 30 will be described. FIG. 2 shows an entire structure of the oxygen sensor 30, and FIG. 3 shows a structure of a sensor element 60 installed in the oxygen sensor 30. As shown in FIG. 2, the oxygen sensor 30 has a cylindrical metallic housing 31 which is to be fixed to a wall of an exhaust pipe. An element cover 32 is connected to a lower opening of the housing 31. A lower portion of an elongate plate-shaped sensor element 60 is disposed in the element cover 32. The element cover 32 has a double-wall structure and its lower end is closed. Plural openings 32*a* are formed in the side walls of the element cover 32 to introduce the exhaust gas thereinto. A cylindrical insulating member 33 is disposed in the housing, and the elongate sensor element 60 is disposed in the insulating member 33. A pair of lead wires 34 is electrically connected to the upper end of the sensor element 60.

A body cover 35 is fixed to the upper end of the housing 31 by calking. A dust cover 36 covers the outside of the body cover 35, so that both covers 35, 36 form a double-cover structure protecting the upper portion of the oxygen sensor 30. Plural openings 35*a*, 36*a* are formed in both covers 35, 36, respectively, to introduce atmospheric air into the oxygen sensor 30.

The sensor element structure will be described with reference to FIG. 3. The sensor element 30 is composed of a detector element 61 made of a solid electrolyte, a gas diffusing layer 62, a duct 63 for introducing atmospheric air, and a heater 64. Those components are laminated on one another, and the outside thereof are covered with a protecting layer 65. The detector element 61 is made of a partially stabilized zirconia plate having a rectangular shape. A gas-side electrode 66 made of platinum is formed on the upper surface of the detector element 61. The gas-side electrode 66 is made porous to expose the upper surface of the detector element 61 to the exhaust gas. An air-side electrode 67 made of platinum is formed on the lower surface of the detector element 61. The air-side electrode 67 is made porous to expose the lower surface of the detector element 61 to the atmospheric air. Both electrodes 66, 67 are electrically connected to the ECU 20 through lead wires 66*a*, 67*a*, respectively.

The gas diffusing layer 62 is composed of a gas-penetrating layer 62*a* made of a porous sheet and a gas-interrupting layer 62*b* made of a solid sheet. Both layers 62*a*, 62*b* are formed from a ceramic sheet such as an alumina, spinel or zirconia sheet, and the porocity thereof is controlled to meet respective requirements of both layers 62*a*, 62*b*. Since the upper surface of the gas-penetrating layer 62*a* is covered with the gas-interrupting layer 62*b*, the exhaust gas is introduced from the sides of the gas-penetrating layer 62*a* (left and right sides of FIG. 3) to reach the gas-side electrode 66.

The duct 63 made of ceramics such as alumina having a high heat conductivity forms an atmospheric chamber 68 therein. Atmospheric air is introduced into the atmospheric chamber 68 through the openings 35*a*, 36*a* of the covers 35, 36 shown in FIG. 2. The heater 64 composed of heater elements 64*a* and an insulating sheet 64*b* is disposed underneath the air-introducing duct 63. Heater current is supplied to the heater elements 64*a* from an on-board battery through a lead wire 64*c*. Alternatively, the heater elements 64*a* may be embedded in the detector element 61 or in the gas-diffusing layer 62.

Figure 4:
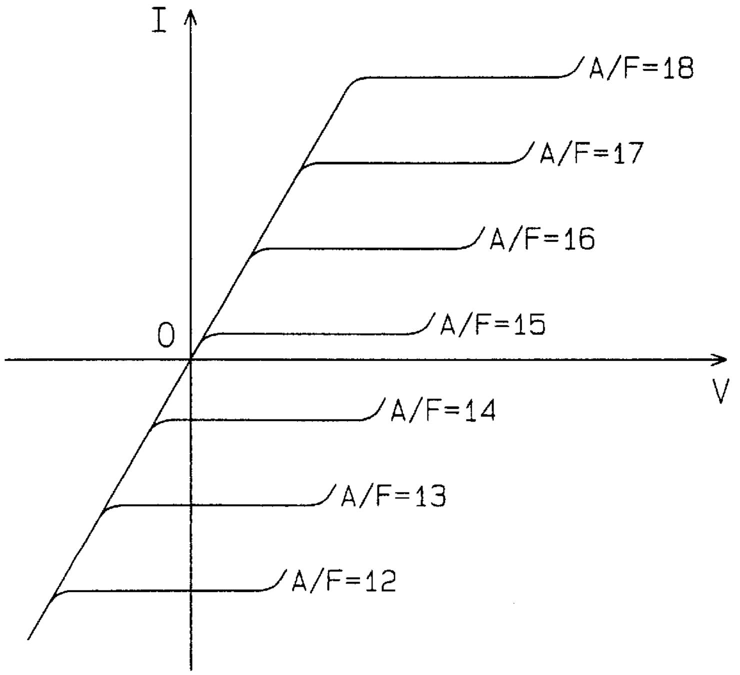
FIG. 4 is a graph showing an output characteristic of the oxygen sensor.

The oxygen sensor 30 structured as above has a voltage-current characteristic shown in FIG. 4. That is, the sensor element 60 outputs a marginal current which is proportional to the oxygen concentration in the exhaust gas. The level of the marginal current corresponds to the air-fuel ratio A/F in the intake system of the engine. As the fuel becomes rich relative to air, the marginal current becomes low. The impedance of the detector element 61 varies in accordance with temperature of the detector element 61. As the detector element temperature rises, the impedance decreases. Therefore, the temperature of the detector element 61 can be controlled at a target temperature (e.g., 750° C.) by controlling the heater current so that the detector element impedance becomes a target value (e.g., 30 Ω). The detector element impedance is detected by measuring the detector element current upon imposition of a single wave voltage as shown in FIG. 5.

Figure 6:
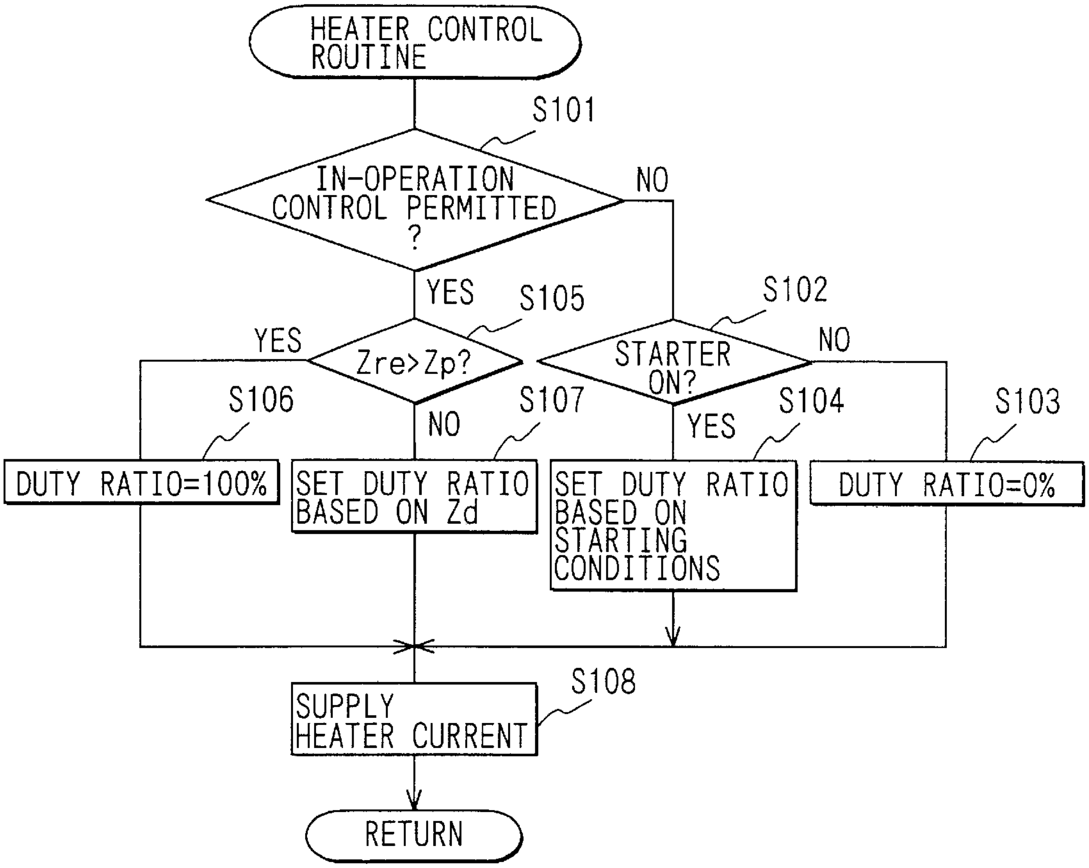
FIG. 6 is a flowchart showing a process for controlling heater current in a first embodiment of the present invention.

The process of controlling the heater current will be described with reference to FIG. 6. This process is performed by the CPU 22 in the microcomputer 21 every 131 milliseconds. Upon starting the heater control, whether an in-operation control is permitted or not is determined at step S101. The in-operation control means a heater current control which is performed after the engine is put into a normal operation. The in-operation control is permitted if the engine speed is higher than a predetermined speed (e.g., 800 rpm) and the battery voltage VB is higher than a predetermined level (e.g., 10 V). Other conditions may be added in permitting the in-operation control. In a period in which the engine is being cranked by a starter motor, the in-operation control is not permitted.

If the in-operation control is not permitted at step S101, the process proceeds to step S102. At step S102, whether the starter is ON or OFF is checked. If the starter is OFF, the process proceeds to step S103, where a duty ratio of the heater current is set to zero not to supply the heater current. If the starter is ON, the process proceeds to step S104, where the duty ratio is set based on engine starting conditions such as a coolant temperature and battery voltage. The process performed at step S104 is referred to as a pre-heating control.

Figure 7:
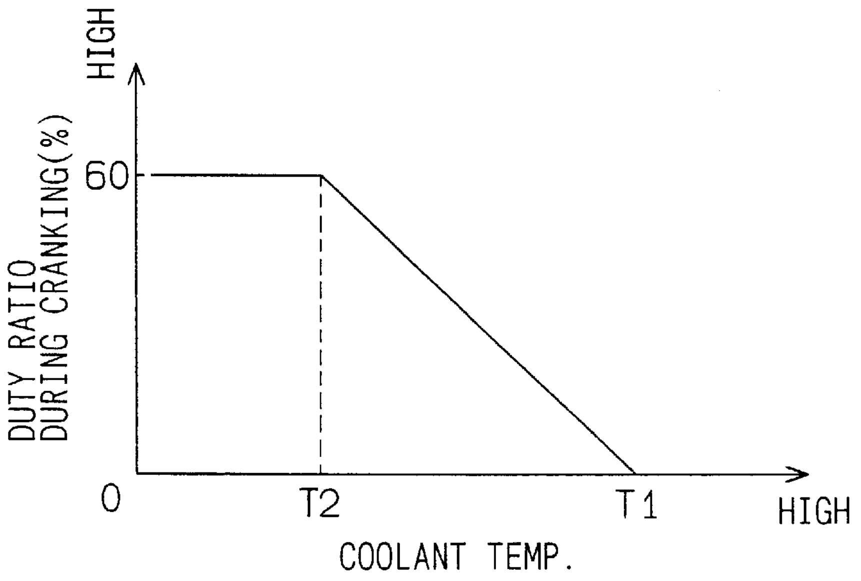
FIG. 7 is a graph showing a relation between a heater current duty ratio and an engine coolant temperature.
Figure 8:
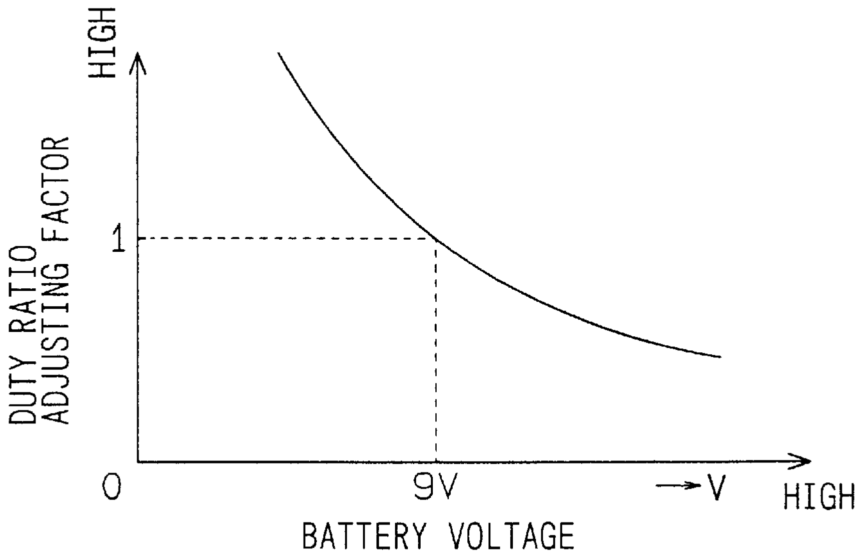
FIG. 8 is a graph showing a factor for adjusting the heater current duty ratio in relation to a battery voltage.

More particularly, the duty ratio of the heater current is set to the level shown in FIG. 7. If the engine coolant temperature is higher than T1, the duty ratio is set to zero. If the coolant temperature is lower than T1 and higher than T2, the duty ratio is set to a level between zero and 60% according to the coolant temperature. If the coolant temperature is lower than T2, the duty ratio is fixed to 60%. The duty ratio set as above is adjusted in accordance with the battery voltage VB. An adjusting factor relative to the battery voltage VB is shown in FIG. 8. The adjusting factor is set to 1 when the battery voltage is 9 V, and the adjusting factor becomes higher as the battery voltage becomes lower. The duty ratio set according to FIG. 7 is multiplied by the adjusting factor shown in FIG. 8. Thus, the duty ratio in the pre-heating control is set at step S104. Then, the process proceeds to step S108, where the heater current is supplied to the heater 64 with the duty ratio set at step S104. As described above, the pre-heating is not performed when the coolant temperature is higher than T1, because the resistance of the heater 64 is relatively high under this situation and there is almost no chance that an excessive heater current is supplied when the in-operation control commences after the engine is put into an normal operation.

On the other hand, if the in-operation control is permitted at step S101, the process proceeds to step S105. At step S105, whether the real impedance Zre of the detector element 61 is higher than a predetermined impedance Zp (e.g., 40 Ω) or not is determined. The real impedance Zre is higher than the predetermined impedance Zp when the detector element 61 is not activated. If the real impedance Zre is higher than the predetermined impedance Zp, the process moves to step S106, where the heater current is supplied with a duty ration of 100%. When Zre becomes equal to or lower than Zp, the process moves to step S107. At step S107, the duty ratio is set according to an impedance difference Zd between Zre and Zp (Zd=Zre−Zp). That is, the duty ratio is set to minimize Zd and to bring the real impedance Zre to the predetermined level Zp. In transient periods, in which the duty ratio is switched from a lower level in the pre-heating control to 100% in the in-operation control and from 100% set at step S106 to a lower level set at step S107, the duty ratio is gradually changed to avoid an abrupt change.

Figure 9:
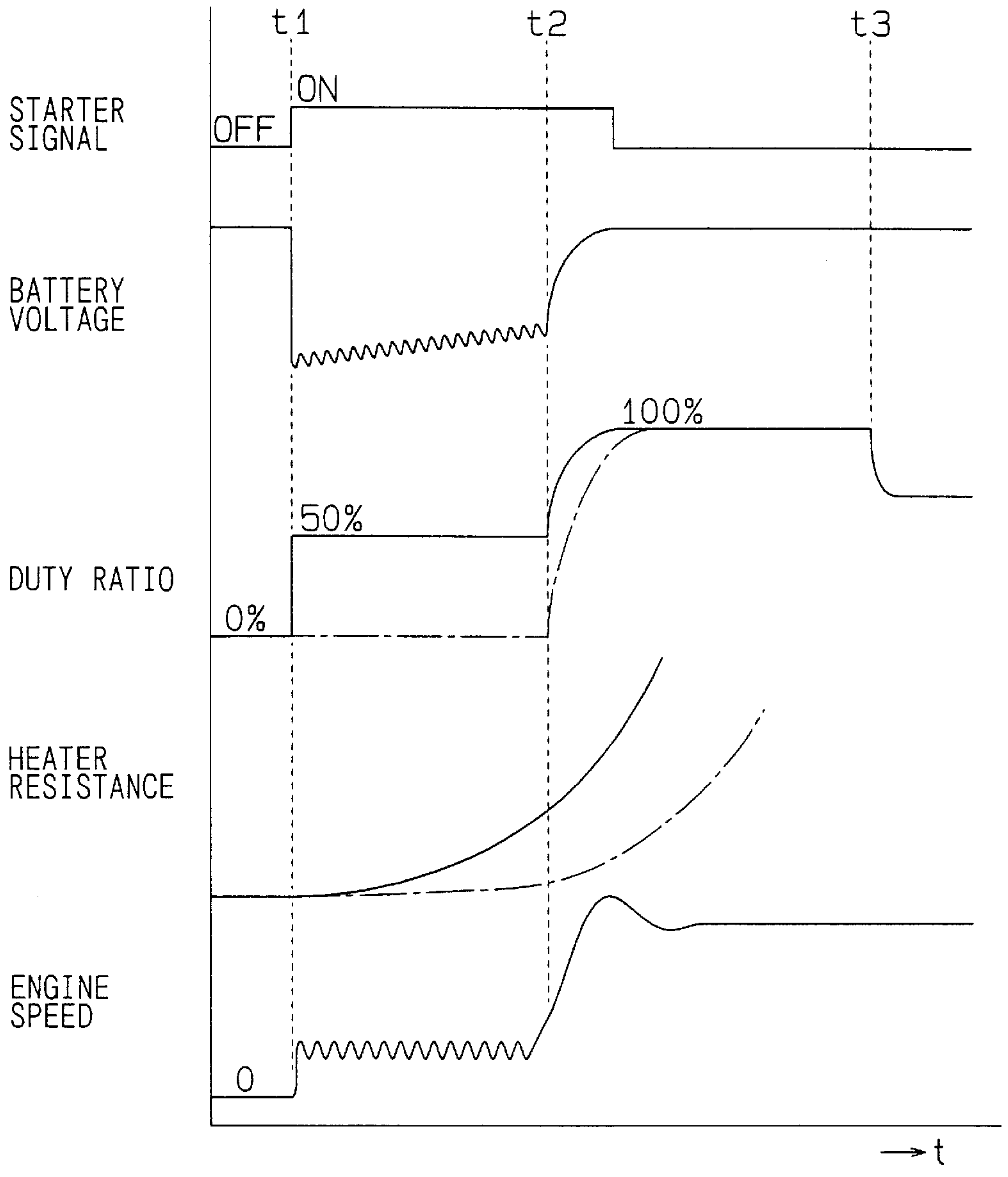
FIG. 9 is a timing chart showing a heater control process during a cranking period and after an engine is put into operation.

Referring to a time chart shown in FIG. 9, the heater current control will be further described. In FIG. 9, the engine cranking starts at time t1 and continues up to time t2, i.e., the cranking period is a period between t1 and t2. At time t2, the engine is put into normal operation and the in-operation heater control commences. In a period between time t2 and time t3, the heater current is supplied with the 100% duty ratio. After time t3, the heater current is controlled to minimize the impedance difference Zd. Solid lines in the duty ratio graph and heater resistance graph in FIG. 9 show situations according to the present invention, while dotted lines show situations in a conventional heater control in which no pre-heating is performed.

At time t1, the engine cranking starts, and the battery voltage temporarily drops during the cranking period from t1 to t2. During the cranking period, the duty ratio is set to 50% in this example to pre-heat the heater, and thereby the heater resistance gradually increases. As the cranking is completed at time t2, the in-operation control is permitted, and the duty ratio is switched from 50% to 100% while avoiding an abrupt change. When the heater current is supplied with 100% duty ratio in the in-operation control at time t2, the heater resistance is sufficiently high because the heater has been pre-heated. Therefore, it is avoided that an excessive current is supplied to the heater 64 at the beginning of the in-operation control. Accordingly, the heater 64 and the detector element 61 are protected from an excessive heat stress due to the excessive heater current.

In the conventional heater control shown with dotted lines, the heater resistance remains low during the cranking period though it increases somewhat due to heat transfer from the exhaust gas. Therefore, a large current is supplied to the heater at the beginning of the in-operation control, giving a high heat stress to the detector element. This may cause a fatal damage in the oxygen sensor. Since the heater is pre-heated during the cranking period according to the present invention, the problem in the conventional system is solved.

Figure 10:
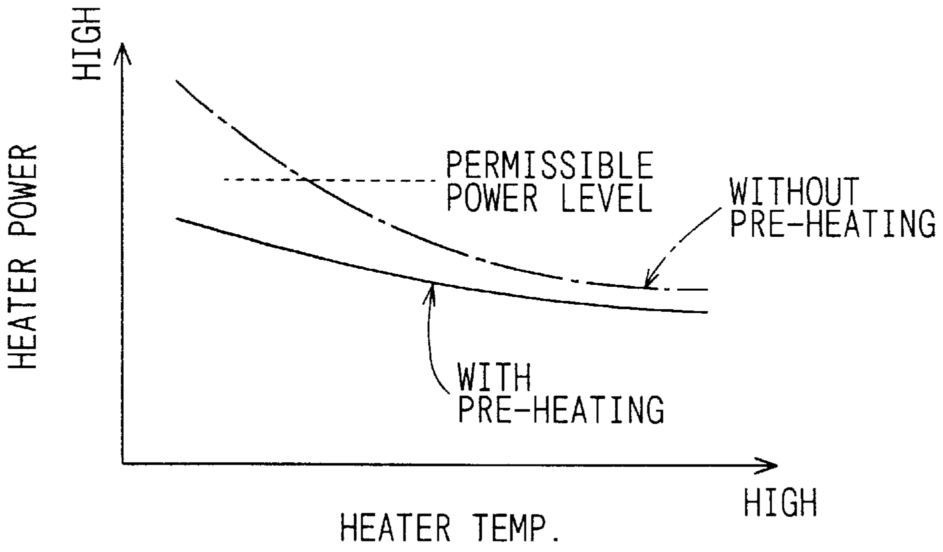
FIG. 10 is a graph showing a power supplied to the heater at a beginning of engine operation in relation to the heater temperature, comparing a control process having preheating with a control process having no pre-heating.

FIG. 10 shows a relation between electric power supplied to the heater and the heater temperature immediately after the engine cranking is completed at a very low temperature. In the conventional control as shown with a dotted line, the power supplied to the heater exceeds a permissible power level at the beginning of the heater power supply. In the heater control according to the present invention as shown with a solid line, the heater power does not exceed the permissible level because the heater is pre-heated during the cranking period.

Figure 11:
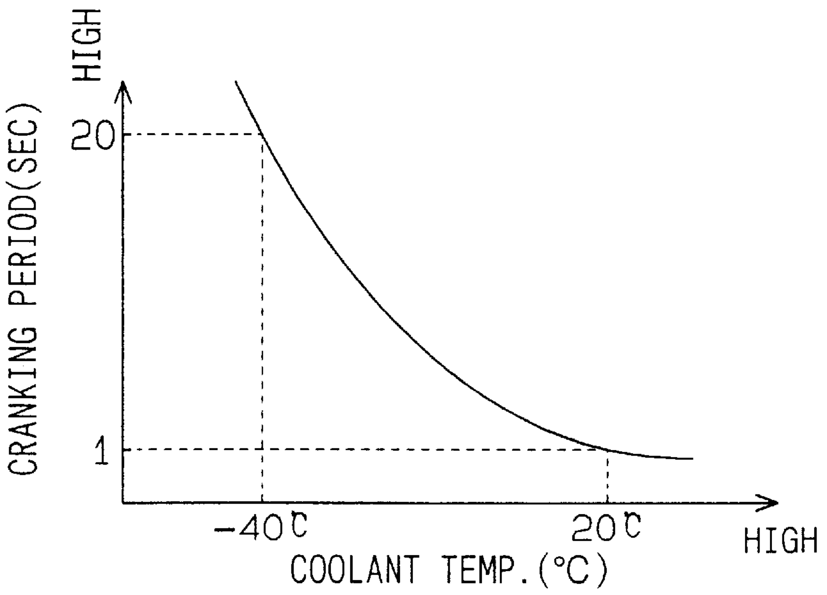
FIG. 11 is a graph showing a cranking period required in relation to a coolant temperature.

FIG. 11 shows a relation between the engine coolant temperature and a period of time required for starting the engine (a cranking period). A longer cranking period is required as the coolant temperature becomes lower. Since the pre-heating of the heater is performed during the cranking period according to the present invention, the heater is pre-heated for a longer time as the coolant temperature becomes low. Therefore, the heater resistance is sufficiently raised during the cranking period even when the engine is started at a very low temperature.

The advantages of the present invention are summarized as follows. The heater 64 is gradually heated by supplying the heater current in a controlled manner during the cranking period, and thereby the heater resistance is sufficiently raised even when the engine is started at a very low temperature. Therefore, an excessive current is not supplied to the heater when the heater current is supplied with 100% duty ratio immediately after the engine is put into operation. Accordingly, components of the oxygen sensor such as the detector element 61 are protected from an excessive heat stress due to the excessive heater current. Since the duty ratio of the heater current is controlled during the pre-heating control, the heater power is controlled not to exceed the permissible heater power, and the battery power is not excessively consumed.

Since the duty ratio is gradually increased from a lower level to the 100% level, an abrupt change of the heating power is avoided, and thereby the heater 64 and the detector element 61 are surely protected from an excessive heat stress. Since the heater temperature is controlled to maintain the detector element impedance at a predetermined value in the in-operation control though the heater resistance is not detected, the detector element 61 is maintained at a properly activated state. Further, in the pre-heating control, the duty ratio determined according to the coolant temperature is adjusted by the battery voltage. Therefore, a substantially constant power is supplied to the heater.

Figure 13:
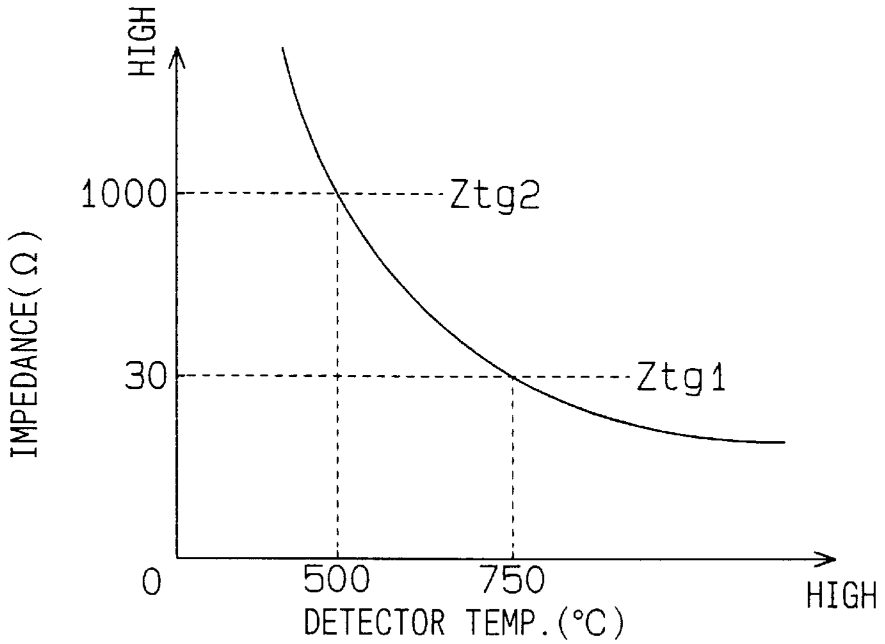
FIG. 13 is a graph showing an impedance of the detector element in relation to a temperature of the detector element.
Figure 14:
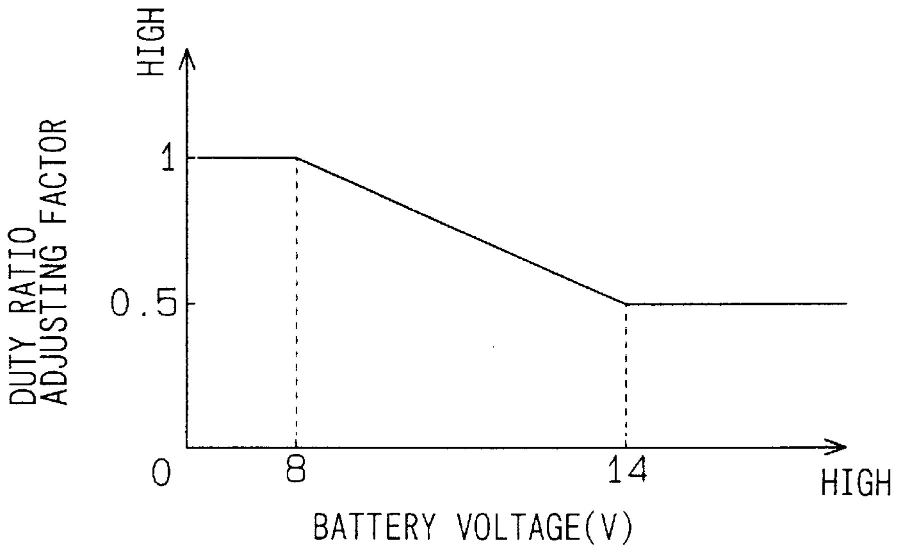
FIG. 14 is a graph showing a duty ratio adjustment factor in relation to a battery voltage.
Figure 15A:
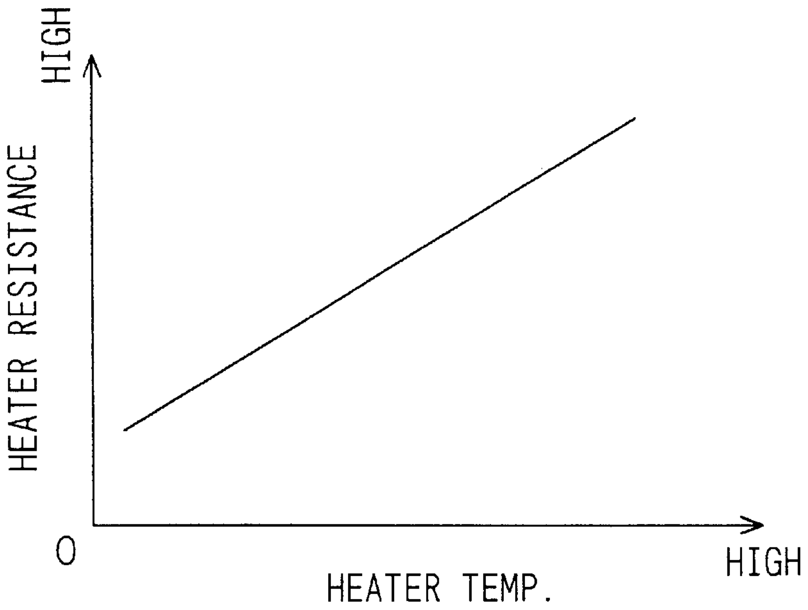
FIG. 15A is a graph showing a relation between a heater resistance and a heater temperature.
Figure 15B:
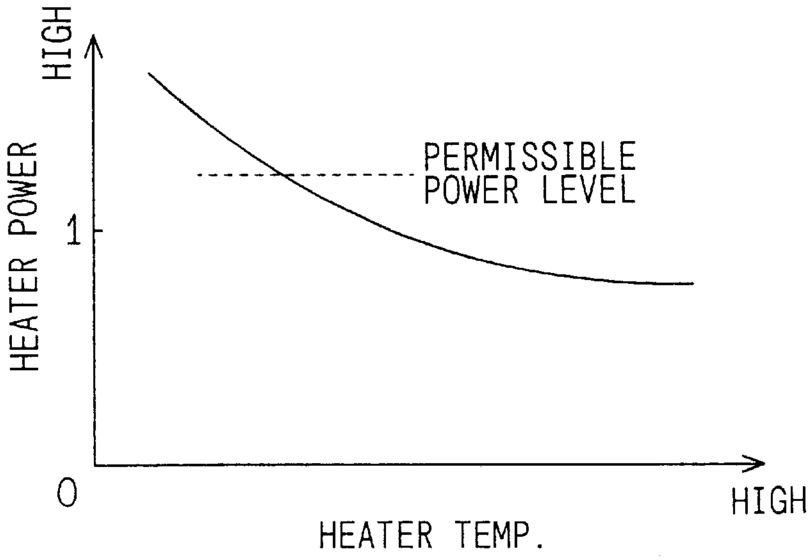
FIG. 15B is a graph showing a relation between a power supplied to the heater and a heater temperature.

A second embodiment of the present invention will be described with reference to FIGS. 12–14. In this embodiment, the heater current is controlled based on a first target impedance Ztg1 in the in-operation control and based on a second target impedance Ztg2 in the pre-heating control. For example, as shown in FIG. 13, the first target impedance Ztg1 of the detector element is set to 30 Ω which corresponds to a detector element temperature 750° C. at which the detector element is activated. The second target impedance Ztg2 is set to 1,000 Ω which corresponds to a detector element temperature 500°C.

Figure 12:
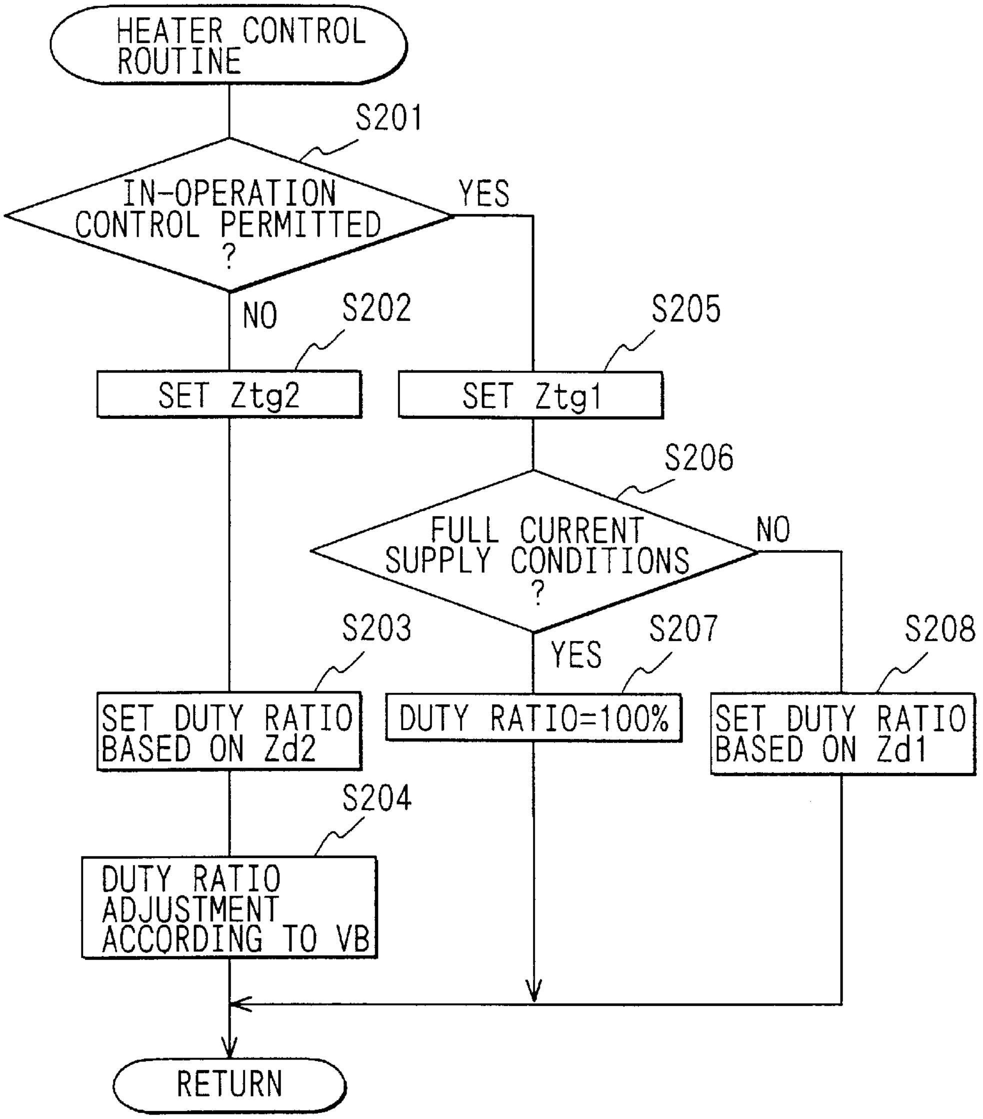
FIG. 12 is a flowchart showing a process for controlling the heater current in a second embodiment of the present invention.

A heater control process of the second embodiment is shown in FIG. 12. This process is performed every 131 milliseconds when the ignition switch is turned on. At step S201, whether the in-operation control is permitted or not is determined. The in-operation control is permitted under the same conditions as described in the first embodiment. For example, the in-operation control is not permitted during the engine being cranked and in a period in which the starter is not yet turned on though the ignition switch is turned on.

If the in-operation control is not permitted, the process proceeds to step S202, where the second target impedance Ztg2 (e.g., 1,000 Ω) is set. Then, at step S203, the duty ratio of the heater current supply is set based on an impedance difference Zd2 between the real impedance Zre and the second target impedance Ztg2 (Zd2 =Zre−Ztg2). At step S204, the duty ratio set at step S203 is adjusted according to the battery voltage in a similar manner as in the first embodiment. For example, the duty ratio adjustment is carried out according to the graph shown in FIG. 14. The adjustment factor is set to 1.0 if the battery voltage is lower than 8 V, to a level between 0.5–1.0 if the battery voltage is higher than 8 V and lower than 14 V, and to 0.5 if the battery voltage is higher than 14 V. The pre-heating control is thus performed through steps S202–S204. That is, the heater temperature is controlled at 500° C. which is lower than the activating temperature 750° C., while adjusting the duty ratio according to the battery voltage to avoid an excessive current supply when the battery voltage is high.

On the other hand, if the in-operation control is permitted at step S201, the process enters the in-operation control. At step S205, the first target impedance Zgt1 (e.g., 30 Ω) is set. Then, at step S206, whether conditions (including an activation state of the detector element) for supplying the heater current with the duty ratio 100% exist or not is determined. If the determination at step S206 is affirmative, the process proceeds to step S207, where the duty ratio is set to 100% to supply a full current to the heater. If the determination at step S206 is negative, the process proceeds to step S208, where the duty ratio is set based on an impedance difference Zd1 between the real impedance Zre and the first target impedance Ztg1 to supply the heater current that minimizes the impedance difference Zd1.

In the second embodiment, the heater current is controlled to bring the detector impedance to the second target value Ztg2 during the cranking period. After the engine is put into operation, the heater current is controlled to maintain the detector element at an optimum temperature. Since the heater is pre-heated during the cranking period, excessive current supply to the heater after the engine is put into operation is prevented.

The present invention is not limited to the embodiments described above, but it may be variously modified. For example, though the duty ratio of the heater current supplied in the cranking period is set based on the coolant temperature in the first embodiment, the coolant temperature may be replaced with an intake air temperature or an atmospheric temperature. Though the lamination-type oxygen sensor is used in the foregoing embodiments, it may be replaced with a cup-type oxygen sensor. This invention may be applied to gas concentration sensors other than oxygen concentration sensor. For example, it may be applied to sensors for detecting the concentration of Nox, HC, CO, or the like.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A heater controller for use in a gas concentration detector, the gas concentration detector including a detector element for detecting constituent gas concentration in exhaust gas of an internal combustion engine, the detector element outputting a marginal current substantially proportional to the constituent gas concentration, and a heater for heating the detector element for activating the detector element, the heater controller comprising:

means for pre-heating the heater during a cranking period of the internal combustion engine, wherein the heater controller commences control of the pre-heating means at starting of the cranking period.

2. The heater controller as in claim 1, wherein:

the pre-heating means supplies current to the heater during the cranking period in a controlled manner.

3. The heater controller as in claim 2, wherein:

the pre-heating means changes an amount of current supplied to the heater according to starting conditions of the engine.

4. The heater controller as in claim 3, wherein:

the pre-heating means controls the amount of current supplied to the heater so that the current amount becomes higher as a temperature at which the internal combustion engine is started becomes lower.

5. The heater controller as in claim 2, wherein:

the pre-heating means adjusts an amount of power supplied to the heater according to a voltage of an on-board battery so that the amount of power supplied to the heater becomes constant.

6. The heater controller as in claim 1, wherein:

the pre-heating means controls an amount of current supplied to the heater based on an impedance of the detector element so that a temperature of the detector element becomes a temperature which is lower than a temperature at which the detector element is activated.

7. The heater controller as in claim 6, wherein:

the pre-heating means adjusts the amount of current supplied to the heater so that the current amount becomes lower as a battery voltage becomes higher.

8. The heater controller as in claim 1, wherein:

the pre-heating means supplies current to the heater only when the internal combustion engine is started at a temperature which is lower than a predetermined level.

9. The heater controller as in claim 1, further comprising in-operation heating means, wherein:

the in-operation heating means supplies a full current to the heater immediately after the cranking of the internal combustion engine is completed and then supplies current to the heater in a controlled manner to keep the detector element activated.

10. The heater controller as in claim 9, wherein:

the heater controller controls an amount of current supplied to the heater so that the current amount is gradually changed from an amount of current supplied in the cranking period to the full current supplied by the in—operation heating means.

11. The heater controller as in claim 1, wherein:

the detector element is made of solid electrolyte; and the detector element and the heater are laminated on each other.

12. The heater controller as in claim 1, further comprising in-operation heating means for supplying current to the heater after the cranking period is completed, wherein an amount of current supplied to the heater by the pre-heating means is smaller than an amount of current supplied to the heater by the in-operation heating means.

13. A gas concentration detector comprising:

a detector element for detecting constituent gas concentration in exhaust gas of an internal combustion engine, the detector element outputting a marginal current substantially proportional to the constituent gas concentration;

a heater for heating the detector element for activating the detector element; and a heater controller including means for pre-heating the heater during a cranking period of the internal combustion engine, wherein the heater controller commences control of the pre-heating means at starting of the cranking period.

14. A method of heating a heater element for activating a detector element that detects concentration of a constituent gas in exhaust gas emitted from an internal combustion engine, the method comprising:

pre-heating the heater element during a cranking period of the internal combustion engine in a controlled manner to raise a resistance of the heater element to a predetermined level, wherein the pre-heating of the heater element commences at starting of the cranking period; and heating the heater element after cranking of the internal combustion engine is completed in a controlled manner to maintain the detector element in an activated state.

* * * * *